United States Patent [19]

Schuchman et al.

[11] Patent Number: 5,365,450
[45] Date of Patent: Nov. 15, 1994

[54] HYBRID GPS/DATA LINE UNIT FOR RAPID, PRECISE, AND ROBUST POSITION DETERMINATION

[75] Inventors: Leonard Schuchman, Potomac, Md.; Ronald Bruno, Arlington, Va.; Robert Rennard, San Martin, Calif.; Charles Moses, Catonsville, Md.

[73] Assignee: Stanford Telecommunications, Inc., Reston, Va.

[21] Appl. No.: 992,892

[22] Filed: Dec. 17, 1992

[51] Int. Cl.⁵ .......................... G01S 5/02; G08G 1/12
[52] U.S. Cl. .................................. 364/449; 364/443; 364/452; 342/457; 342/450
[58] Field of Search .............. 364/449, 443, 452, 460; 342/457, 450, 451, 463, 357

[56] References Cited

U.S. PATENT DOCUMENTS

| | | | |
|---|---|---|---|
| 4,445,118 | 4/1984 | Taylor et al. | 343/357 |
| 4,750,197 | 6/1988 | Denekamp | 379/58 |
| 4,751,512 | 6/1988 | Longaker | 342/357 |
| 4,785,463 | 11/1988 | Janc et al. | 375/1 |
| 4,884,208 | 11/1989 | Marinelli et al. | 364/460 |
| 5,036,329 | 7/1991 | Ando | 342/357 |
| 5,043,736 | 8/1991 | Darnell et al. | 342/357 |
| 5,148,179 | 9/1992 | Allison | 342/357 |
| 5,175,557 | 12/1992 | King et al. | 342/357 |
| 5,177,490 | 1/1993 | Ando et al. | 342/357 |
| 5,185,610 | 2/1993 | Ward et al. | 342/357 |
| 5,194,871 | 3/1993 | Counselman, III | 342/357 |
| 5,202,829 | 4/1993 | Geier | 364/449 |

FOREIGN PATENT DOCUMENTS

| | | |
|---|---|---|
| 0123562 | 10/1984 | European Pat. Off. . |
| 0242099 | 10/1987 | European Pat. Off. . |
| 2541801 | 8/1984 | France . |
| 8912835 | 6/1988 | WIPO . |

OTHER PUBLICATIONS

"Radionavigation Systems", B. Forssell, pp. 282–283.
"The GPS Navigation Message", A. J. Van Dieren--Donal et al., pp. 55–73.

Primary Examiner—Thomas G. Black
Assistant Examiner—Julie D. Day
Attorney, Agent, or Firm—Jim Zegeer

[57] ABSTRACT

A global positioning system (GPS) in which a plurality earth orbiting satellites transmit position information to mobile radio stations on earth, is provided with a separate source satellite position data broadcast digital channels and one or more dial-up service separate communication channels (selected from a data link supported by terrestrial cellular telephone and other radio packet data services) for assisting the mobile radio station to access position information from the satellites. A controller is coupled to the mobile radio station for connecting to the separate communication channel for extricating the satellite position data via separate communication channel. The controller includes a microprocessor for processing the satellite position data to enable the mobile radio station to rapidly locate and access position information from said earth orbiting satellite. A unique system for processing the data is disclosed.

11 Claims, 3 Drawing Sheets

HYBRID GPS/DATA LINE UNIT FOR RAPID, PRECISE, AND ROBUST POSITION DETERMINATION

This invention relates to method and apparatus for enabling rapid and accurate measurement of position, and more particularly to global position system (GPS) for achieving precise position location in the urban canyon and other line of sight obstructed environments.

BACKGROUND AND BRIEF DESCRIPTION OF THE INVENTION

Most modern GPS receivers employ the GPS satellite almanac and rough information on current time and position to attempt to acquire signals of visible GPS satellites by searching in a limited number of frequency bins over a time uncertainty hypothesis of one millisecond, the repetition interval of the GPS C/A codes. In general, the entire sequence of events for arriving at a estimate of position location is in accordance with the following sequence of events:

1. Detection of a satellite PN code in a frequency bin,
2. Acquisition and tracking of the carrier frequency,
3. Acquisition and tracking of the data transitions and data frame boundary,
4. Reading broadcast data for the satellite ephemeris and time model (the 900 bit Satellite Data Message),
5. Completing steps 1–4 (serially or in parallel) for all in-view satellites,
6. Making pseudorange measurements on these signals in parallel, and
7. Computation of position using the pseudorange measurements and satellite data.

The time required to accomplish these steps in a conventional GPS receiver will vary depending upon the assumed starting point of the GPS receiver. It is useful to define three reference starting points for a GPS receiver. These are as follows:

Cold Start: Where the receiver has no GPS almanac. The GPS almanac is a 15,000 bit block of coarse ephemeris and time model data for the entire GPS constellation. Without an almanac, the GPS receiver must conduct the widest possible frequency search to acquire a satellite signal. In this case, signal acquisition can take several minutes to accomplish because a large number of frequency cells must be searched that takes into account the large uncertainties in satellite Doppler as well as GPS receiver oscillator offset. The terms "frequency bin" or "frequency cell" (used interchangeably herein) mean a narrow frequency range or spectrum, each frequency bin or cell having a characteristic center frequency and a predefined width or band of frequencies. In addition, acquisition of the GPS almanac will take at least 12½ minutes of listening to the broadcast of a single GPS satellite.

Warm Start: Where the receiver has a GPS almanac to aid the acquisition of satellite signals by greatly reducing the uncertainty in satellite Doppler and therefore number of frequency cells that must be searched. In this case, the number of frequency cells that must be searched is determined by the accuracy of the GPS local oscillator. For a typical oscillator accuracy of one ppm, the frequency search can be accomplished in less than 10 seconds. In this case, the major time bottleneck for generating a position fix is the time required to acquire the 900 bits of the Satellite Data Message for each GPS satellite that is to be used in computing the receiver position. This Message is broadcast every 30 seconds at 50 bps. For parallel GPS receiver channels, the time requirement to obtain the 900 bit Message from each in-view satellite is roughly 30 seconds.

Hot Start: Where the receiver already has the Satellite Data Messages for all the in-view GPS satellites (7200 bits for eight satellites). In this case, the major time bottleneck is the acquisition of multiple satellite signals and generating pseudorange measurements from them (steps 6 and 7 above). The condition of a GPS receiver is "hot" if it recently (minutes) traversed the steps 1–5 above, or if it received the Satellite Data Messages from an alternate source. From a hot start, position determination begins at steps 6 and 7. This can be accomplished quite rapidly if a pseudorange measurement is utilized to calibrate out the frequency uncertainty of the GPS receiver oscillator, thereby enabling the rapid acquisition of subsequent satellite signals with a search over only a single frequency cell. Thus, from a hot start, it is possible to achieve a position fix very rapidly (in less than one second) if a search algorithm is used that minimizes the required frequency search band for signal acquisition.

This invention merges GPS position location and wireless data communication technologies to achieve a precise position location via GPS in the urban canyon and other line-of-sight obstructed environments. A multi-channel GPS receiver with the capability to simultaneously track (and make pseudorange measurements with) all in-view GPS satellites is used in conjunction with an algorithm that makes maximum use of all a prior information about the GPS receiver (its oscillator bias, its location, its knowledge of time) and the ephemeris and time models of the GPS constellation received by a wireless data communication channel or link to enable rapid acquisition of the GPS signal.

As shown above, currently, there are two time bottlenecks in estimating accurate position via GPS. One of these is due to the oscillator bias of the GPS receiver which is a driver for a time consuming search over many frequency cells.

According to the invention, the search over frequency is required only for the acquisition of the first GPS satellite. The frequency measurement from tracking that one satellite is then used to calibrate out the frequency bias of the GPS local oscillator. Thus, the subsequent acquisition of other GPS satellite signals can be accomplished very rapidly because the number of frequency cells that must be searched is reduced to one.

The second time bottleneck in determining precise position location is the necessity to read the 900 bit GPS Satellite Data Message block containing the ephemeris and satellite clock models of the GPS satellites. This data message must be extracted for each satellite that is used for the GPS position solution. Extracting this needed information for determining position will take 30 seconds in a clear environment; in an obstructed environment, extracting this information may take far longer, and in the worst case, may not be possible at all. According to the invention, this is supplied to the GPS receiver with the needed ephemeris and satellite clock information via an independent wireless data channel such as can be supported by an RDS FM broadcast or a cellular telephone channel. With a cellular telephone, the needed data can be supplied by calling (or receiving a call from) a service center and establishing a data link via a modem in the cellular phone, and a modem to a service center. The required GPS satellite information is then supplied via the established data link. At typical modem speeds (1.2 Kbps to 19.6 Kbps), this information is supplied in only a few seconds to less than one second, depending upon the modem speed. In this manner, the GPS is assisted in rapid signal acquisition and rapid determination of position, even in obstructed environments.

DESCRIPTION OF THE DRAWING

The above and other objects advantages and features of the invention will become more apparent when considered with the following specifications and accompanying drawings wherein.

DETAILED DESCRIPTION OF THE INVENTION

Figure 1:
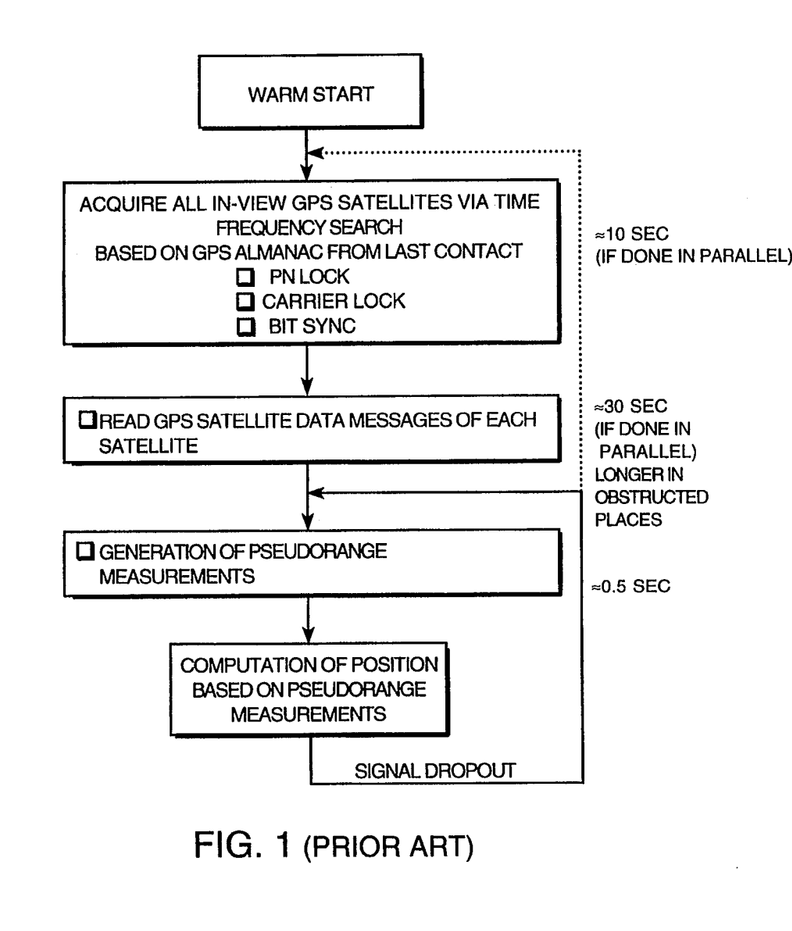
FIG. 1 is a chart illustrating prior and warm start sequence of events in a GPS system.

FIG. 1 illustrates the sequence of events and the time requirements to estimate the position via a typical GPS receiver from a warm start. From a warm start, the first step in the process is the reading the GPS Satellite Data Messages contained in the broadcast signals of each satellite. This proceeds with the acquisition of tile signals from all in-view satellites (which may take up to 10 seconds). Acquisition begins with PN code acquisition and proceeds to move through the processes of detection confirmation, PN tracking, frequency locked loop pull-in, conversion to phase lock for data demodulation, followed by bit and frame synchronization. Within 40 seconds after a warm start, the receiver will typically have extracted the necessary satellite ephemeris and clock data in the Satellite Data Message of each satellite (i.e., if no obstructions are presented). For a receiver that is presented with obstructions, the time required to collect the necessary data can be quite long. GPS data is transmitted in 1500 bit frames at 50 bits per second. Thus, each frame is transmitted in 30 seconds. The 1500 bit frame of each broadcast is composed of five subframes of 300 bits length. The first three subframes of a broadcast signal (900 bits) comprise the Satellite Data Message for the broadcasting satellite. The Satellite Data Message contains precise ephemeris and time model information, for that satellite. The first three subframes are identically repeated in each 1500 bit frame, except that the information is updated periodically. The fourth and fifth subframe contain a part of the almanac which contains coarse ephemeris and time model information for the entire GPS constellation. The contents of the fourth and fifth subframes change until the entire almanac is sent. The repetition period of the fourth and fifth subframes is 12½ minutes and so the entire GPS almanac is contained in 15,000 bits. The subframes are composed of 10 words of 30 bits length with Hamming (32, 26) parity concatenation across words. This means that the last two bits of the previous word are part of the 26 bits used to compute a six bit syndrome. Therefore, it is necessary to receive all 32 bits of each word without interruption.

THE PRESENT INVENTION

The present invention removes the two greatest time bottlenecks discussed above in determining position via the GPS system. One bottleneck is eliminated by providing the GPS receiver with the needed Satellite Data Messages of the GPS constellation via an external data link supported by the cellular channel. The Satellite Data Messages for eight in-view satellite will be contained in 7200 bits or less; thus, with an external link at data rates from 1.2 Kbps up to 19.2 Kbps, the time required to transfer the needed Satellite Data Messages will take from a few seconds to only a fraction of a second. The second bottleneck that the invention eliminates is the time required to acquire the signal from subsequent satellites after the first satellite is acquired. It accomplishes this by an algorithm that optimally using GPS ephemeris and time model data together with the Doppler measurement on a single satellite signal to calibrate the GPS receiver frequency reference and thereby reduce the frequency uncertainty (and therefore the time required) for acquisition of subsequent satellite signals.

Figure 2:
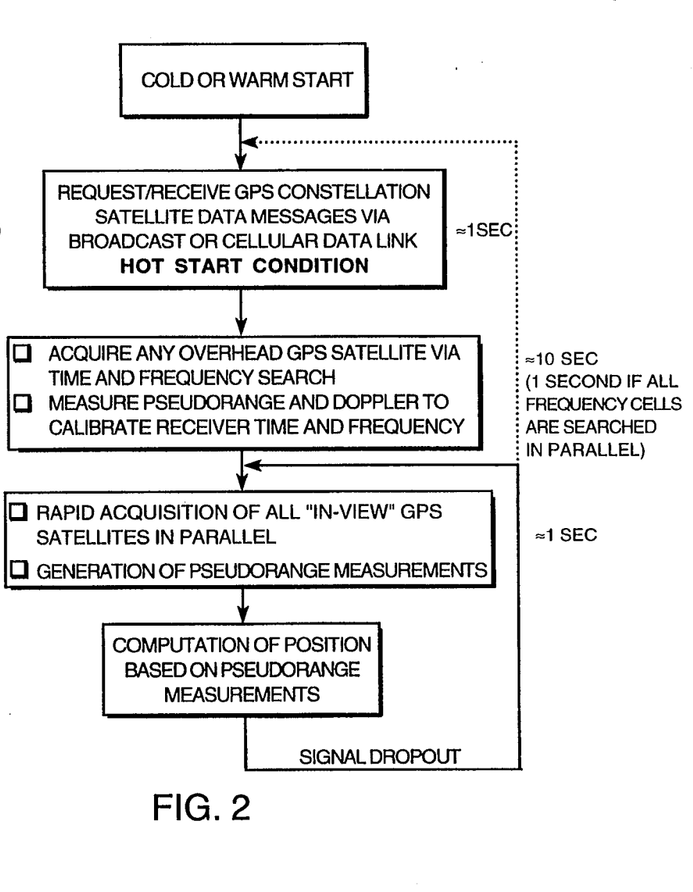
FIG. 2 is a chart illustrating the warm start sequence according to the invention.

FIG. 2 illustrate the general strategy and algorithm for a GPS receiver capable of rapid acquisition. While the embodiment discussed herein assumes an eight-channel receiver capable of simultaneously tracking all "in-view" GPS satellites, it is clear that more satellites could be used. The start of any position determination via GPS is normally the acquisition of the signal from the "in-view" GPS satellites in order to read the Satellite Data Messages. However, in this case, the current Satellite Data Message of the GPS constellation are first requested and received via an independent link such as a data link supported by the cellular telephone system. As soon as the first satellite is acquired, the pseudorange and Doppler are measured. Using the Doppler information from this measurement allows subsequent satellites to be rapidly and reliably acquired and reacquired as the mobile host vehicle progresses through obstructed fields of view.

According to the invention, at the acquisition from a warm start-up, the receiver's oscillator offset is the dominant factor in determining the frequency error of uncertainly ($f_e$) of a broadcast GPS satellite signal. The GPS receiver has either a user-entered, or integral timing function, which is accurate to $t_e$. Using this local time value, the receiver employs a GPS satellite almanac which was previously collected, or was injected via a data port to estimate which GPS satellite is most directly overhead. This computation produces an estimate of the line-of-sight Doppler offset of the GPS L1 carrier frequency relative at the fixed at the location of the GPS receiver. The frequency search aperture is the sum of error in this line-of-sight Doppler offset estimate, the Doppler offset due to motion of the user vehicle, and the offset of the GPS receiver local oscillator scaled to the L1 carrier frequency. For a t of one minute, the error in the estimated offset will typically be about 60 Hz. If the user velocity is assumed to be less than 30 meters per second, this will produce an additional 76 Hz frequency uncertainty. (With the velocity vector principally in the local tangent plane, its contribution to the search aperture is 150 Hz times the cosine of the elevation angle to the satellite which presumably is above 60 degrees, thus reducing the offset by half.) The crystal oscillator is presumed to have a one ppm accuracy, giving an offset of ±1580 Hz when scaled to the L1 frequency. This results in a total frequency uncertainty of roughly ±1700 Hz around the computed Doppler offset.

The C/A code can be searched at a rate of 1000 chip timing hypotheses per second per correlator per channel for a detection probability of 0.95 and a false alarm probability of 0.01 assuming a 10 dB-Hz C/kT. Typically, triple correlator (early, punctual, and late) spacing is 1.5 chips or less. Thus a specific C/A signal can be searched in one Doppler bin of 500 Hz width in one second or less. There are seven bins in the 3500 Hz frequency uncertainly band (each 500 Hz wide) thereby requiring a total search time of seven seconds to acquire the first signal. However, if an eight-channel receiver is used to acquire a chosen overhead GPS satellite, all frequency cells can be searched simultaneously and the satellite signal can be acquired in one second. Upon acquisition of the signal, the signal is tracked, and a measurement of pseudorange and Doppler is obtained. This convergence requires less than 4 seconds.

This Doppler measurement is then used to collapse the frequency uncertainty in acquisition of subsequent satellite signals by calibrating the GPS local oscillator against the Doppler measurement. The acquisition frequency uncertainty band is then reduced to the sum of the uncertainties of the ephemeris data and the vehicle Doppler, or less than a few hundred Hz. Consequently, subsequent satellite signal acquisitions can be accomplished in only one second via a search over only a single 500 Hz frequency cell. Thus, with an eight-channel receiver, all in-view satellites can be acquired in parallel in only one second, and pseudorange measurements can be generated in an additional ½ second. Until the data frames from at least one GPS satellite are read, the above measurements contain a time-range ambiguity equal to the period of the PN code (1 msec-300 km). If time framing for only one satellite signal is established, this time-position ambiguity is resolved. As mentioned above, reading the required data frames on the broadcast signal will require roughly 30 seconds. However, this time bottleneck can be avoided as long the a prior position uncertainty is sufficiently small to resolve the ambiguity. The requirement will, in general, depend upon the GDOP of the in-view GPS constellation, but it is clear that the assumed a prior assumption of 10 km will be more than sufficient to resolve the ambiguity. Thus, position location is possible without ever taking the time to read the GPS data. In summation, with the invention that starts with providing the GPS receiver with the needed Satellite Data Messages via an external data link, the position may be determined in less than three seconds.

Figure 3:
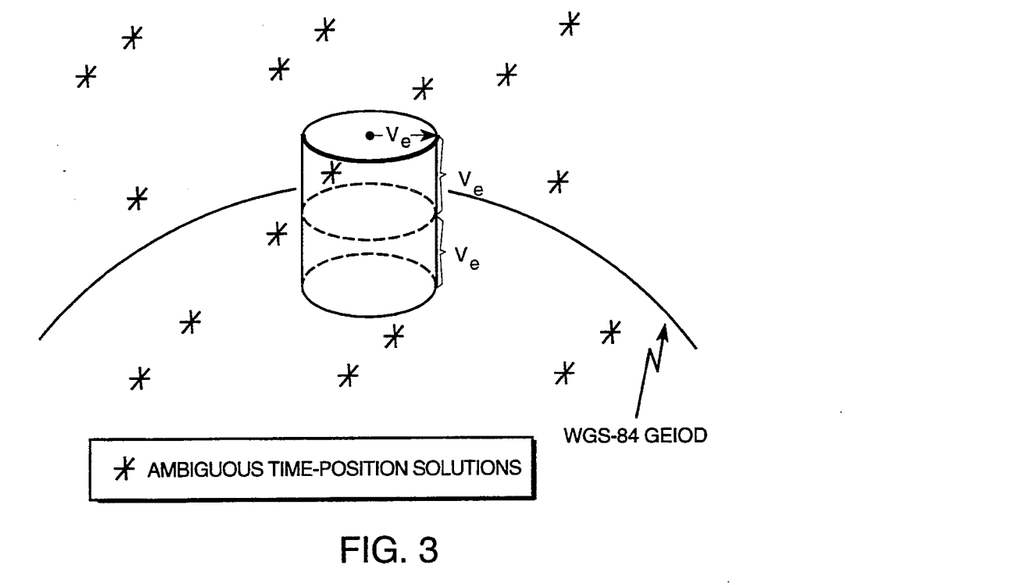
FIG. 3 is a schematic illustration of how a priori knowledge of position resolves the ambiguity in time-position.

FIG. 3 illustrates how the a prior knowledge of position resolves the ambiguity in time-position. It pictures a cylindrical start-up position uncertainty volume of height $2 v_e$ and radius $r_e$. Here, $v_e$ denotes a bound on the uncertainty in altitude relative to the WGS-84 geoid and $r_e$ denotes a bound on the radial uncertainty in position from a known point in the plant tangent to the geoid. At start-up, the receiver is somewhere within this uncertainty cylinder, and the receiver's software assumes that it is located at the center of the cylinder. The uncertainty cylinder determines the ability of the a prior position knowledge to resolve the time-position ambiguity of the GPS receiver. In the worst case situation, the uncertainty cylinder will result in an uncertainty corresponding to a distance of $v_e^2 + r_e^2$. If one assumes a value of 10 km for this quantity, the resulting local clock uncertainty will be about 30 microseconds. In general, based upon pseudorange measurements with the in-view satellites, there will be a number of GPS receiver time-position pairs that are consistent with these pseudorange measurements). However, only those solutions contained inside the position uncertainty cylinder and the time uncertainty window (one minute assumed) can be real solutions. And it is clear that as long as the uncertainty cylinder is not large, there will only be one time-position pair in this region so that the solution is unique and the ambiguity is resolved.

Figure 4:
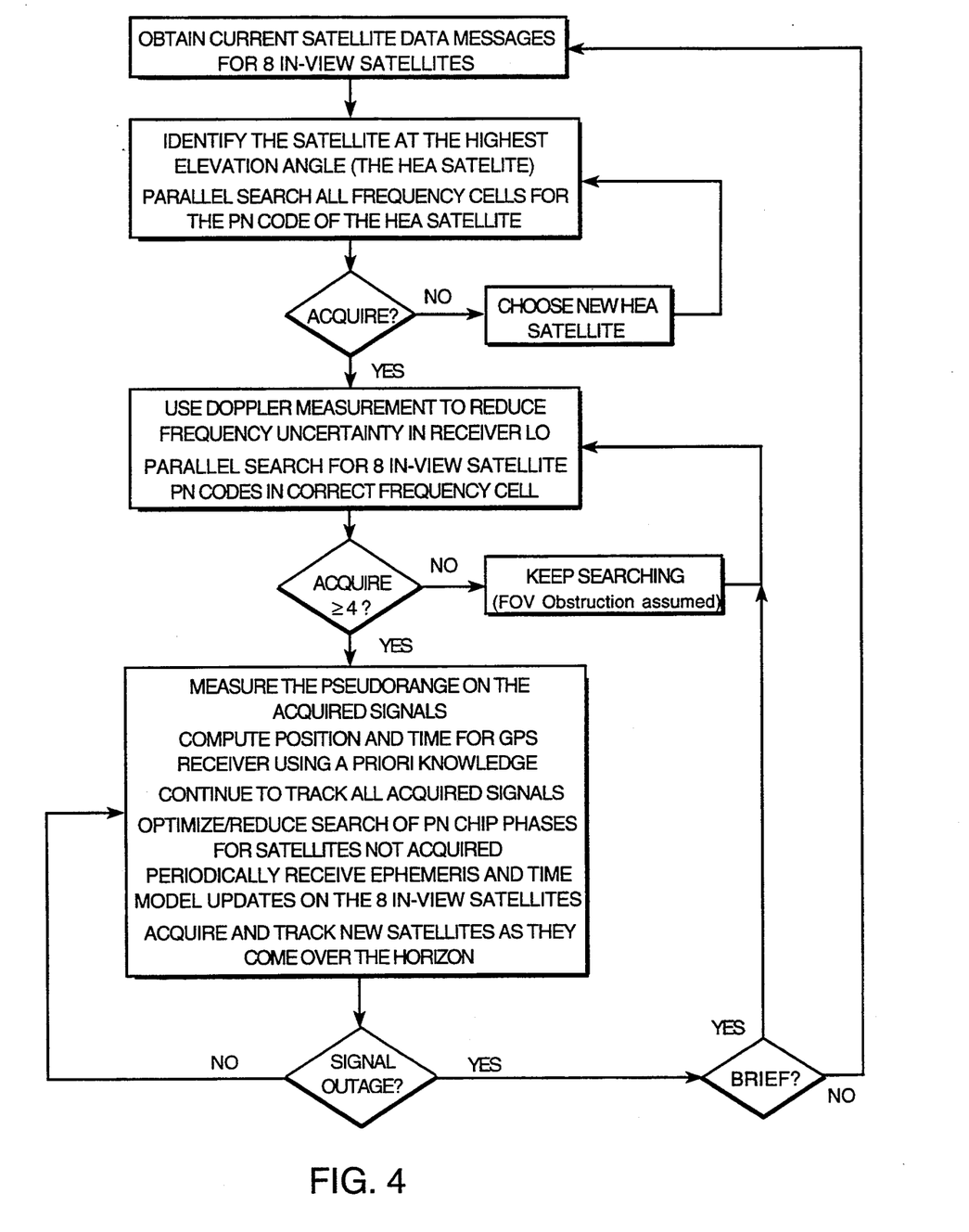
FIG. 4 is a flow chart of signal processing according to the invention.

Subsequent to resolving the time ambiguity of the GPS receiver, acquiring satellites can be further aided by the reduced time as well as frequency uncertainties. With a one ppm GPS receiver clock drift, time can be maintained to better than 60 microseconds, even with the receiver outages lasting up to one minute. Thus, the required PN search to acquire a satellite can be reduced to a search over less than 100 C/a code chip positions. The frequency uncertainty is still much less than a 500 Hz cell. Thus, it should be possible to acquire subsequent satellite signals in 0.1 seconds by searching 100 code chip phases in a single frequency bin. A measurement of pseudorange using code phase under condition of frequency lock can be made in an additional 0.5 seconds. Thus, once the GPS receiver time and frequency are calibrated, it is possible to acquire and generate pseudorange measurements from multiple satellite signals in parallel in less than one second. Thus, in this reacquisition mode, the time required for position location is indeed quite short. In situations where signals are obstructed by tall structures except at the crossroads, this is the only way that a GPS position fix can be generated. The search process for multiple satellite signals is repeated endlessly, and acquisition of multiple satellite signals will occur whenever the view to multiple satellites is unobstructed. The detailed logic of the algorithm for rapid GPS signal acquisition is illustrated in FIG. 4.

Figure 5:
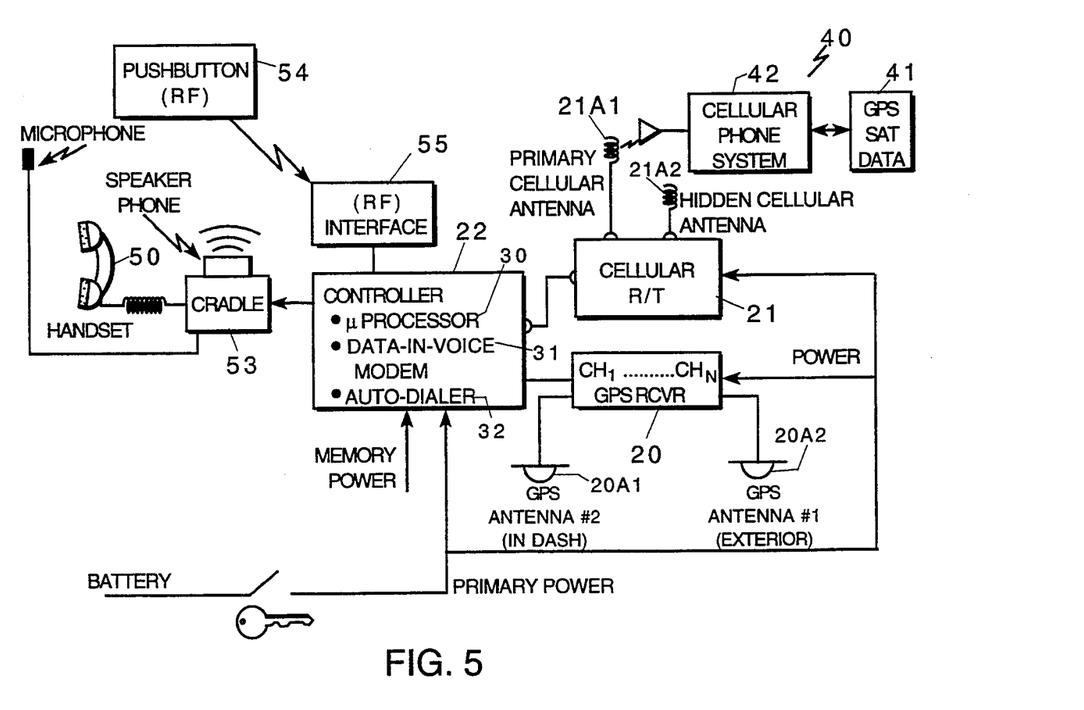
FIG. 5 is a block diagram of GPS receiver combined with a cellular telephone according to the invention.

FIG. 5 illustrates a preferred embodiment or configuration which includes a GPS receiver 20 combined with a cellular telephone 21, having a primary cellular antenna 21A1 and a hidden parallel cellular antenna 21A2 that is capable of supporting the rapid acquisition capability of the GPS signals, and rapid determination of position. The GPS receiver 20 has an in-dash antenna 20A1 and a roof or exterior antenna 20A2 and a plurality of parallel channels CH . . . CHn for independent attempts at acquiring multiple (sight in this embodiment) satellites simultaneously. This is required since it is important that the acquisition process for the first satellite can search the entire frequency uncertainty region in parallel. Given that the state-of-the-art oscillators for GPS receivers have a frequency accuracy of about one pm, this requires at least seven parallel channels to encompass the frequency uncertainty band. When oscillator frequency accuracy improves, then the preferred number of parallel channels can be reduced. The eight-channel receiver is also important for rapid acquisition in parallel of all in-view satellites. With an eight-channel receiver, all in-view satellite signals will be searched for; thus as long as the line-of-sight to a given in-view satellite is not blocked, its signal will be typically acquired in less than one second with a rapid acquisition receiver. The GPS receiver 20 is under the control of the controller element 22 shown in FIG. 5, which includes a microprocessor 30, modem 31, autodialer 32, and a transmit voice/data switch 33. The first step in using the unit to determine the position via GPS would be for the controller to acquire the Satellite Data Messages for the in-view GPS satellites. In one embodiment, this is provided by intercepting a broadcast signal such as the RDS in the FM radio band, or by calling a service center 40 and establishing data link with a compatible modem. The current ephemeris and time models of the GPS satellite constellation stored in the GPS satellite almanac database 41 would then be provided to the unit via that data link—the cellular telephone system 42. This link would also provide GPS correction parameters that support much improved GPS position accuracy when the GPS is in the search and acquisition mode. The controller 22 would thus obtain the Satellite Data Messages of in-view Satellites, and route this data to the GPS receiver 20 where it would be used to support the acquisition of the first overhead satellite, support the subsequent acquisition of all inview satellites, and calculate the position of the receiver, based upon subsequent pseudorange measurements with these satellites. A memory power is supplied to controller 22 to maintain data stored therein.

The system shown in FIG. 5 also includes a wireless cellular telephone handset 50, RF linked by antenna 51 to antenna 52 on cordless basestation 53, an RF pushbutton device 54 for theft alarm enable/disable initiation, and the RF interface 55 for that device to controller 22. The handset 50 is connected to the cellular transceiver via a cordless RF link supported by the basestation. The handset has all the controls (not shown) needed to initiate and receive calls from the telephone system, but the installed unit in the vehicle acts as relay station to the cellular system 42. The handset 50 serves as the interface for voice input and audio output for the vehicle user. The controller 22 mediates the transmission of voice and data over the common cellular telephone channel. The RF pushbutton device 54 is used to enable/disable a theft reporting function of the vehicle unit. This function is to autonomously initiate a call when a defined theft condition is realized and to accurately relay the vehicle position as determined by the GPS receiver 21.

One example of such condition is whenever the system receives battery power with the theft reporting function in the enabled state. The pushbutton device 54 is packaged in a small keychain type unit similar to those for alarm enable/disable of current vehicle theft alarm equipment.

This invention provides the most rapid and robust position location system possible via the GPS constellation. The novel aspects of the system are the use of an external data link to the GPS receiver to rapidly provide the Satellite Data Messages, and the efficient system and method that optimally uses this information to rapidly acquire all in-view satellites.

What is claimed is:

1. In a global positioning system (GPS) in which a plurality earth orbiting GPS satellites transmit position information to mobile radio stations on earth including a Satellite Data Message block, the improvement comprising:

an earth based source of satellite data for all in-view GPS satellites including said Satellite Data Message blocks for each in-view satellite for assisting said mobile radio station to access position information from said satellites, and an earth based communication means coupled to said source, means coupled to said mobile radio station for connecting to said earth based communication means to said earth-based source for extricating said satellite position data via said non-satellite earth based communication means, and means at said mobile for processing said Satellite Data Message blocks from said earth-based source to enable said mobile radio station to rapidly locate and access position information from said earth orbiting satellite.

2. The invention defined in claim 1 wherein said earth-based source includes one or more dial-up service channels selected from a data link supported by terrestrial cellular telephone and other radio packet data services, and means accessing said earth-based source via one of said dial-up service channels to supply said Satellite Data Messages for all in-view satellites and said GPS receiver.

3. The invention defined in claim 2 in which said Satellite Data Message block contains ephemeris data and time models for each in-view satellite, said mobile radio station including a receiver local oscillator and means for performing a parallel search over an entire frequency uncertainty band to acquire a GPS satellite overhead and calibrating said receiver local oscillator to reduce the frequency band for the acquisition of subsequent in-view satellites, and performing a further parallel search for all in-view satellites using a single frequency search cell per satellite.

4. The invention defined in claim 2 including a basestation for a cordless cellular telephone handset, an RF control means for remote control of said handset, an RF interface means connected to said handset to said RF control means, said handset being coupled to said GPS receiver, and modem means located in the mobile unit, whereby access to said handset provides access to the full range of capabilities, including, generation and relay of position, supported by the mobile unit.

5. In a GPS system wherein a plurality of GPS satellites transmit their respective time and location data including a Satellite Data Message block having ephemeris and time modes over radio frequency signals which enable a mobile GPS receiver on the ground receive said radio frequency signal to determine its position, the improvement comprising: a source of satellite data message block containing the ephemeris and time modes of the GPS satellites, which is independent of said satellite, an independent wireless data channel for accessing said satellite data message block, and a controller means connecting said satellite data message block to said mobile GPS receiver.

6. The invention defined in claim 5 wherein said wireless data channel is a cellular telephone.

7. The invention defined in claim 6 wherein said cellular telephone includes a cordless handset and further including a basestation relay means for said cordless handset for allowing remote use of said handset via said basestation relay means.

8. The invention defined in claim 6 including a pushbutton controlled RF control signal source, means for coupling control signals to said controller means to cause said mobile GPS receiver to determine its position and transmit, via said cellular telephone, the determined position to a predetermined location.

9. In a GPS satellite positioning system in which a plurality of earth orbiting GPS satellites each transmit Satellite Data Messages, including ephemeris data and time models, said Satellite Data Messages being transmitted in a frequency uncertainty band, tile method of optimally and rapidly acquiring all in view satellites comprising:

provid­ing a receiver for said GPS satellite having a local oscillator, performing a parallel search over the entire frequency uncertainty band to acquire an overhead GPS satellite, calibrating said receiver local oscillator to reduce the frequency band for the acquisition of subsequent in-view satellites, and performing a further parallel search for all in-view satellites using a single frequency search cell per in-view satellite.

10. In a method for determining the position of a user of a GPS receiver for receiving GPS satellite signals containing GPS broadcast data, bit sync signals and frame sync signals, the improvement comprising, providing an independent source of a prior knowledge of receiver position to resolve ambiguity in the time position of the GPS solution.

11. In a GPS satellite positioning system for use in obstructed environments where much of the time, the line of site to most satellites is blocked and occasionally is clear, as on roads and urban areas or in heavily forested regions, comprising, providing a GPS receiver having a calibratable local oscillator and capable of performing parallel search for acquisition of all in-view satellites, comprising:

performing a parallel search for all in-view satellites, and reducing the frequency uncertainty band for signal reacquisition to one frequency cell by calibrating the GPS local receiver oscillator on the basis of a pseudo-range measurement of one overhead satellite.

* * * * *

(12) EX PARTE REEXAMINATION CERTIFICATE (6636th)

United States Patent
Schuchman et al.

(10) Number: US 5,365,450 C1
(45) Certificate Issued: Feb. 3, 2009

(54) HYBRID GPS/DATA LINE UNIT FOR RAPID, PRECISE, AND ROBUST POSITION DETERMINATION

(75) Inventors: Leonard Schuchman, Potomac, MD (US); Ronald Bruno, Arlington, VA (US); Robert Rennard, San Martin, CA (US); Charles Moses, Catonsville, MD (US)

(73) Assignee: ITT Manufacturing Enterprises, Inc., Wilmington, DE (US)

Reexamination Request:
No. 90/008,048, Jun. 15, 2006

Reexamination Certificate for:
Patent No.: 5,365,450
Issued: Nov. 15, 1994
Appl. No.: 07/992,892
Filed: Dec. 17, 1992

(51) Int. Cl.
*G01S 5/00* (2006.01)
*G01S 5/02* (2006.01)
*G01S 5/14* (2006.01)
*G01S 1/00* (2006.01)
*H04B 7/185* (2006.01)

(52) U.S. Cl. .................... 455/456.3; 342/450; 342/457; 701/200; 701/219

(58) Field of Classification Search ................ None
See application file for complete search history.

(56) References Cited

U.S. PATENT DOCUMENTS

| | | | |
|---|---|---|---|
| 4,809,005 A | 2/1989 | Counselman, III |
| 5,119,102 A | 6/1992 | Barnard |
| 5,194,871 A | 3/1993 | Counselman, III |
| 5,225,842 A | 7/1993 | Brown et al. |

FOREIGN PATENT DOCUMENTS

| | | |
|---|---|---|
| CA | 2066831 | 11/1992 |
| GB | 2241623 | 9/1991 |
| JP | 01138479 | 5/1989 |

OTHER PUBLICATIONS

Schuchman et al., "Applicability of an Augmented GPS for Navigation in the National Air Space System, Proceedings of the IEEE," vol. 77, No. 11 (Nov. 1989), All Pages.

RTCM Paper 134–89/SC 104–68, "RTCM Standards for Differential NAVSIAR GPS Service," v. 2.0, RTCM Special Committee No. 104, Jan. 1, 1990, Chapter 4.

A. Buige et al., "The design and measured performance of an experimental GPS navigation receiver for general aviation," in Pro. Position Location Nav. Symp. (Atlantic City, NJ, Dec. 1982), all pages.

Campbell et al., Report No. FAA-RD-83/26, "An Experimental GPS Navigation Receiver for General Aviation Design and Measured Performance," Lincoln Lab., MIT, Sep. 27, 1983; pp. 1–50, 102.

(Continued)

*Primary Examiner*—Charles Craver (57) ABSTRACT

A global positioning system (GPS) in which a plurality earth orbiting satellites transmit position information to mobile radio stations on earth, is provided with a separate source satellite position data broadcast digital channels and one or more dial-up service separate communication channels (selected from a data link supported by terrestial cellular telephone and other radio packet data services) for assisting the mobile radio station to access position information from the satellites. A controller is coupled to the mobile radio station for connecting to the separate communication channel for extricating the satellite position data via separate communication channel. The controller includes a microprocessor for processing the satellite position data to enable the mobile radio station to rapidly locate and access position information from said earth orbiting satellite. A unique system for processing the data is disclosed.

OTHER PUBLICATIONS

Wong et al., "A High Accuracy Dual–Band GPS Marine Navigation System," Proceedings of International Symposium on Marine Positioning, INSMAP 90, 1991, pp. 305–312.

Brown, "The TIDGET™—A Low Cost GPS Sensor for Tracking Applications," Proceedings of ION GPS–92, Sep. 16–18, 1992, all pages.

S. Campbell, R. LaFrey, "Flight Test Results for an Experimental GPS C/A–code Receiver in a General Aviation Aircraft," Navigation: J. of the Inst. Of Navigation, vol. 30, No. 4, 1983–84, all pages.

Mattos, "A Map–Based GPS System for Vehicle Use," Proceedings of ION GPS–92 Conference, Sep. 1992, all pages.

SBIR Final Report, Application of Differential GPS to Expeditionary Airfield Navigation & Surveillance Requirements, Nov. 30, 1988, all pages.

Young, W. R. "Advanced Mobile Phone Service: Introduction, Background, and Objectives," *Bell System Technical Journal*, Jan. 1979, p. 7.

Peterson, A.C., Jr. "Vehicle Radiotelephony Becomes a Bell System Practice," *Bell Laboratories Record*, Apr. 1947, pp. 137–141.

"Telephone Service for St. Louis Vehicles," *Bell Laboratories Record*, Jul. 1946, pp. 267–269 and Peterson, A.C., Jr. "Vehicle Radiotelephony Becomes a Bell System Practice," *Bell Laboratories Record*, Apr. 1947, pp. 137–141.

Douglas, V. A., "The MJ Mobile Radio Telephone System," *Bell Laboratories Record*, Dec. 1964, p. 383.

Stephen W. Gibson, *Cellular Mobile Radiotelephones*, Englewood Cliffs: Prentice Hall, 1987, p. 8.

Advanced Mobile Phone Service, Inc., *Preliminary Cellular Mobile Telephone Equipment Specification*, May 1983.

Fluhr and Porter, "Control Architecture," *The Bell System Technical Journal*, vol. 58, No. 1, Jan. 1979, p. 50.

Elrod et al., Application of Differential GPS to the Marine Air Traffic Control and Landing System Phase II Study. Prepared by Bryant Elrod, Stephen Heppe, Robert Kleinhenz. Nov. 30, 1988.

Elrod et al., Application of Differential GPS to Expeditionary Air field Navigation and Surveillance Requirements, Stanford Telecommunications. Mar. 29, 1985.

Elrod et al., Interface Control Document STI GPS Navigator to/From Flight/Ground Executive in Matcals Differential GPS Test Bed (SBIR Phase II Study). Prepared by Elrod, Heppe, Kleinhenz, Dunham and Heger. Apr. 17, 1987.

Campanile et al., GPS Acquisition Performance in the Presence of Jamming.

Van Dierendonck, et al., "The GPS Navigation Message," *Global Positioning System*, Papers published in Navigation vol. 1, reprinted by The Institute of Navigation, Alexandria, VA, copyright 1980; ISBN 0–936406–00–3.

Order Vacating Markman Order, *ITT Manufacturing Enterprises, Inc.*, v. *Samsung Telecommunications America LP, et al.*, Civil Action No. 1:03–CV–01086–GMS (Judge Sleet), Feb. 15, 2006.

Expert Report of Stephen B. Heppe, D.Sc. Regarding Validity of U.S. Pat. No. 5,365,450, *ITT Manufacturing Enterprises, Inc.*, v. *Samsung Telecommunications America LP, et al.*, Civil Action No. 1:03–CV–01086–GMS (Judge Sleet), Oct. 7, 2005.

Expert Report of Dr. Stephen B. Wicker Regarding Invalidity of U.S. Pat. No. 5,363,450, *ITT Manufacturing Enterprises, Inc.* v. *Samsung Electronics America, Inc. et al.*, Civil Action No. 03–1086 (GMS), Sep. 9, 2005.

Elrod, et al., "A GPS Receiver Design for General Aviation Navigation,", Stanford Telecommunications, Inc., IEEE, pp. 33–41.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–11 are determined to be patentable as amended.

New claims 12–57 are added and determined to be patentable.

1. In a global positioning system (GPS) in which a plurality *of* earth orbiting GPS satellites transmit position information to mobile radio stations on earth including a Satellite Data Message block, the improvement comprising:
   an earth based source of satellite *position* data for all in-view GPS satellites including said Satellite Data Message [blocks] *block* for each in-view satellite for assisting *one of* said mobile radio [station] *stations* to access position information from said *earth orbiting* GPS satellites, *wherein said earth based source of satellite position data receives and stores the satellite position data, including the satellite data message block, from each of the in-view GPS satellites,* and an earth based communiation means coupled to said *earth based* source *of satellite position data,*
   means coupled to said mobile radio station for connecting to said earth based communication means to said earth-based source *of satellite position data* for extricating said satellite position data via said [non-satellite] earth based communication means, *wherein the satellite data message block supplied by said earth based source to said mobile radio station is extracted from said stored satellite position data,* and
   means at said mobile *radio station* for processing said Satellite Data Message [blocks] *block* from said earth-based source *of satellite position data* to enable said mobile radio station to rapidly locate and access position information from said earth orbiting *GPS* [satellite] *satellites*.

2. The invention defined in claim 1 wherein said earth-based source *of satellite position data* includes one or more dial-up service channels selected from a data link supported by terrestrial cellular telephone and other radio packet data services, and means accessing said earth-based source *of* satellite *position data* via one of said dial-up service channels to supply said Satellite Data [Messages] *Message block* for all in-view satellites [and said GPS receiver] *to said mobile radio station*.

3. [The invention defined in claim 2 in which] *In a global positioning system (GPS) in which a plurality of earth orbiting GPS satellites transmit position information to mobile radio stations on earth including a Satellite Data Message block, the improvement comprising:*
   *an earth based source of satellite position data for all in-view GPS satellites including said Satellite Data Message block for each in-view satellite for assisting one of said mobile radio stations to access position information from said earth orbiting GPS satellites, and an earth based communication means coupled to said earth based source of satellite position data,*
   *means coupled to said mobile radio station for connecting to said earth based communication means to said earth-based source of satellite position data for extricating said satellite position data via said earth based communication means, and*
   *means at said mobile radio station for processing said Satellite Data Message block from said earth-based source of satellite position data to enable said mobile radio station to rapidly locate and access position information from said earth orbiting GPS satellites, wherein:*
   said earth-based source of satellite position data includes one or more dial-up service channels *selected from a data link supported by terrestrial cellular telephone and other radio packet data services, and means accessing said earth-based source of satellite position data via one of said dial-up service channels to supply said Satellite Data Message block for all in-view satellites to said mobile radio station;* and
   said Satellite Data Message block *for each in-view satellite* contains *current* ephemeris data and time models for [each in view] *that* satellite, said mobile radio station including a receiver local oscillator and means for performing a parallel search over an entire frequency uncertainty band to acquire a GPS satellite overhead and calibrating said receiver local oscillator to reduce the frequency band for the acquisition of subsequent in-view satellites, and performing a further parallel search for all in-view satellites using a single frequency search cell per satellite.

4. [The invention defined in claim 2 including] *In a global positioning system (GPS) in which a plurality of earth orbiting GPS satellites transmit position information to mobile radio stations on earth including a Satellite Data Message block, the improvement comprising:*
   *an earth based source of satellite position data for all in-view GPS satellites including said Satellite Data Message block for each in-view satellite for assisting one of said mobile radio stations to access position information from said earth orbiting GPS satellites, and an earth based communication means coupled to said earth based source of satellite position data,*
   *means coupled to said mobile radio station for connecting to said earth based communication means to said earth-based source of satellite position data for extricating said satellite position data via said earth based communication means,*
   *means at said mobile radio station for processing said Satellite Data Message block from said earth-based source of satellite position data to enable said mobile radio station to rapidly locate and access position information from said earth orbiting GPS satellites,* and
   a basestation for a cordless cellular telephone handset, an RF control means for remote control of said handset, an RF interface means connected to said handset to said RF control means, said handset being coupled to said [GPS receiver] *mobile radio station*, and modem means located in the [mobile unit] *mobile radio station*, whereby access to said handset provides access to the full range of capabilities, including, generation and relay of position, supported by the [mobile unit] *mobile radio station*, wherein said earth-based source of satellite position data includes one or more dial-up service channels selected from a data link supported by terrestrial cellular telephone and other radio packet data services, and means accessing said earth-based source of satellite position data via one of said dial-up service channels to supply said Satellite Data Message block for all in-view satellites to said mobile radio station.

5. In a GPS system wherein a pluraltiy of GPS satellites transmit their respective time and location data including a Satellite Data Message block having ephemeris and time [modes] *models* over radio frequency signals which enable a mobile GPS receiver on the ground *to* receive said radio frequency [signal] *signals* to determine its position, the improvement comprising:

an earth-based source of *the* satellite data message [block] *blocks* containing the ephemeris and time [modes] *models* of [the] *in-view* GPS satellites, which *earth-based source* is independent of said [satellite] *GPS satellites*, an independent wireless data channel for accessing said satellite data message block, and a controller means connecting said satellite data message block to said mobile GPS receiver, *wherein said mobile GPS receiver acquires the in-view GPS satellites using the ephemeris and time models of the in-view GPS satellites received from the earth-based source.*

6. The invention defined in claim 5 wherein said wireless data channel is a cellular telephone *channel and said mobile GPS receiver is coupled to a cellular telephone*.

7. The invention defined in claim 6 wherein said cellular telephone includes a cordless handset [and], *the invention* further including a basestation relay means for said cordless handset for allowing remote use of said hanset via said basestation relay means.

8. The invention defined in claim 6 including a pushbutton controlled RF controlled signal source, means for coupling control signals to said controller means to cause said mobile GPS receiver to determine its position and transmit, via said cellular telephone *channel*, the determined position to a predetermined location.

9. In a GPS satellite positioning system in which a plurality of earth orbiting GPS satellites each transmit Satellite Data Messages, including ephemeris data and time models, said Satellite Data Messages being transmitted in a frequency uncertainty band, [tile] *a* method of optimally and rapidly acquiring all [in view] *in-view* GPS satellites comprising:

providing a receiver for *receiving signals from* said GPS [satellite] *satellites, said receiver* having a local oscillator, providing data from the Satellite Data Messages transmited by the in-view GPS satellites to the receiver via a non-GPS earth-based source, performing a parallel search over the entire frequency uncertainty band to acquire an overhead GPS satellite, calibrating said receiver local oscillator to reduce the frequency band for the acquisition of subsequent in-view satellites, and performing a further parallel search for all *subsequent* in-view satellites using a single frequency search cell per in-view satellite.

10. In a method for determining the position of a user of a GPS receiver for receiving GPS satellite signals containing GPS broadcast data, bit sync signals and frame sync signals, the improvement comprising, providing an independent source of [a] prior knowledge of receiver position to resolve ambiguity in [the] *a* time position of [the] *a* GPS solution, and supplying assisting data transmitted by in-view GPS satellites via the independent source to assist the GPS receiver in acquiring the GPS satellite signals.

11. In a GPS satellite positioning system for use in obstructed environments where much of the time, the line of site to most satellites is blocked and occasionally is clear, as on roads and urban areas or in heavily forested regions, comprising, providing a GPS receiver having a calibratable local oscillator and capable of performing parallel search for acquisition of all in-view *GPS* satellites, comprising:

supplying assisting data transmitted by the in-view GPS satellites via an earth-based independent source to assist the GPS receiver in acquiring GPS satellite signals; and performing a parallel search for all in-view *GPS* satellites, reducing [the] *a* frequency uncertainty band for signal reacquistion to one frequency cell by calibrating the [GPS] *calibratable* local [receiver] oscillator on the basis of a pseudo-range measurement of one overhead satellite.

12. The invention of claim 1, wherein the satellite data message block supplied to the mobile radio station is less than 900 bits.

13. The invention of claim 1, wherein the satellite data message block supplied to the mobile radio station by the earth based source is 900 bits of a satellite data message broadcast by an in-view GPS satellite.

14. The invention of claim 12, wherein the earth based source of satellite position data receives the satellite position data from the in-view GPS satellites and broadcasts the satellite position data to the mobile radio station over said earth based communication means.

15. The invention of claim 1, wherein the earth based source of satellite position data receives a satellite data message from each in-view GPS satellite, and wherein the satellite data message block supplied to the mobile radio station includes, from the satellite data message, only current ephemeris data and time models.

16. The invention of claim 1, wherein, for each in-view GPS satellite, the satellite data message block contains current ephemeris data and time models, and wherein the mobile radio station used the current ephemeris data and time models to assist the acquisition of at least one of the in-view GPS satellites.

17. In a global positioning system (GPS) in which a plurality of earth orbiting GPS satellites transmit position information to mobile radio stations on earth including a Satellite Data Message block, the improvement comprising:

an earth based source of satellite position data for all in-view GPS satellites including said Satellite Data Message block for each in-view satelilte for assisting one of said mobile radio stations to access position information from said earth orbiting GPS satellites, and an earth based communication means coupled to said earth based source of satellite position data, means coupled to said mobile radio station for connecting to said earth based communication means to said earth-based source of satellite position data for extricating said satellite position data via said earth based communication means, and means at said mobile radio station for processing said Satellite Data Message block from said earth-based source of satellite position data to enable said mobile radio station to rapidly locate and access position information from said earth orbiting GPS satellites, wherein the mobile radio station performs a parallel search over a frequency uncertainty band to acquire one of the in-view GPS satellites and performs a further parallel search with a reduced frequency uncertainty to acquire subsequent in-view GPS satellites, the reduced frequency uncertainty being determined from acqusition of said one of the in-view GPS satellites.

18. The invention of claim 1, wherein the earth based communication means includes a cellular telephone service center and the means for connecting incudes a cellular telephone receiver.

19. The GPS system of claim 5, wherein each of the satellite data message blocks supplied to the mobile GPS receiver by the earth-based source is less than 900 bits of a satellite data message broadcast by an in-view GPS satellite.

20. The GPS system of claim 5, wherein each of the satellite data message blocks supplied to the mobile GPS receiver by the earth-based source is 900 bits of a satellite data message broadcast by an in-view GPS satellite.

21. The GPS system of claim 19, wherein the earth based source receives the satellite data message blocks from the in-view GPS satellites and broadcasts the satellite data message blocks to the mobile GPS receiver.

22. The GPS system of claim 5, wherein the earth based source receives a satellite data message from each in-view GPS satellite, and wherein the satellite data message block supplied to the mobile GPS receiver includes, from the satellite data message, only current ephemeris data and time model information for that in-view GPS satellite.

23. The GPS system of claim 5, wherein, for each in-view GPS satellite, the satellite data message block contains current ephemeris data and time models, and wherein the mobile GPS receiver uses the current ephemeris data and time models to assist the acquisition of the respective in-view GPS satellite.

24. In a GPS system wherein a plurality of GPS satellites transmit their respective time and location data including a Satellite Data Message block having ephemeris and time models over radio frequency signals which enable a mobile GPS receiver on the ground to receive said radio frequency signals to determine its position, the improvement comprising:

an earth-based source of the satellite data message blocks containing the ephemeris and time models of in-view GPS satellites, which earth-based source is independent of said GPS satellites, an independent wireless data channel for accessing said satellite data message block, and a controller means connecting said satellite data message block to said mobile GPS receiver, wherein the mobile GPS receiver performs a parallel search over a frequency uncertainty band to acquire one of said in-view GPS satellites and performs a further parallel search with a reduced frequency uncertainty to acquire subsequent in-view GPS satellites, the reduced frequency uncertainty being determined from acquisition of said one of the in-view GPS satellites.

25. The method of claim 9, further comprising:
using the data provided by the non-GPS earth-based source to assist in acquiring the in-view GPS satellites.

26. The method of claim 10, wherein the assisting data is supplied via a cellular telephone channel.

27. The method of claim 10, wherein the independent source is a non-GPS earth-based source.

28. The method of claim 27, wherein the assisting data is supplied from a cellular telephone service center to a cellular telephone receiver coupled to the GPS receiver.

29. The method of claim 27, wherein the assisting data includes ephemeris and time models of at least one GPS satellite.

30. The method of claim 29, wherein the assisting data includes ephemeris and time models of a plurality of GPS satellites, and wherein the GPS receiver determines the position of the user by acquiring the GPS satellite signals from the plurality of GPS satellites with the assistance of ephemeris and time models and computes the GPS solution from pseudo-range measurements made from the GPS satellite signals.

31. The method of claim 27, wherein the GPS receiver uses the assisting data to assist in searching for the GPS satellite signals.

32. The method of claim 31, wherein the GPS receiver performs a parallel search over a frequency band determined from the assisting data to acquire a first in-view GPS satellite and performs a further parallel search with a reduced frequency uncertainty to acquire subsequent in-view GPS satellites, the reduced frequency uncertainty being determined from acquisition of said first in-view GPS satellite.

33. The method of claim 27, wherein the GPS receiver measures a plurality of pseudo-ranges for a respective plurality of acquired GPS satellites and determines the position of the user from the plurality of pseudo-ranges.

34. The method of claim 10, wherein the ambiguity is a pseudo-range ambiguity.

35. The method of claim 10, wherein resolving the ambiguity substantially eliminates ambiguity in an apparent time of flight of the GPS satellite signals.

36. The method of claim 10, wherein the GPS reciever performs a parallel search over a frequency band to acquire a first in-view GPS satellite and performs a further parallel search with a reduced frequency uncertainty to acquire subsequent in-view GPS satellites, the reduced frequency uncertainty being determined from acquisition of the first in-view GPS satellite.

37. The invention of claim 11, wherein the pseudo-range measurement corresponds to an apparent distance from said one overhead satellite to the GPS receiver.

38. The invention of claim 1, wherein the mobile radio station is in a cold start or warm start condition for acquisition of an in-view GPS satellite prior to receipt of the satellite data message block for the in-view GPS satellite, and wherein receipt of the satellite data message block from the earth based source enables the mobile radio station to acquire the in-view GPS satellite from a hot start condition.

39. The invention of claim 1, wherein the mobile radio station receives the satellite data message block for an in-view GPS satellite from the earth based source prior to acquisition of the in-view GPS satellite, and wherein receipt of the satellite data message block enables the mobile radio station to rapidly acquire the in-view GPS satellite without need of a satellite data message block transmitted directly from the in-view GPS satellite to the mobile radio station.

40. The invention of claim 1, wherein the mobile radio station receives the satellite data message block for an in-view GPS satellite from the earth based source prior to initial acquisition of the in-view GPS satellite, and wherein the mobile radio station performs initial acquisition of the in-view GPS satellite using the satellite data message block received from the earth based source.

41. The invention of claim 1, wherein the mobile radio station uses the satellite data message block received from the earth based source in acquiring at least one of the in-view GPS satellites without assistance from satellite position data transmitted directly from the in-view GPS satellites to the mobile radio station.

42. The invention of claim 1, wherein the satellite position data includes 900 bits and the satellite data message block supplied to the mobile radio station includes less than 900 bits.

43. The invention of claim 1, wherein the earth based source comprises a database.

44. The invention of claim 1, wherein the satellite data message block is used to resolve ambiguity in a time-position of a GPS solution.

45. The GPS system of claim 5, wherein the mobile GPS receiver is in a cold start or warm start condition for acquisition of an in-view GPS satellite prior to receipt of the ephemeris and time model for the in-view GPS satellite, and wherein receipt of the ephemeris and time model from the earth-based source enables the mobile GPS receiver to acquire the in-view GPS satellite from a hot start condition.

46. The GPS system of claim 5, wherein the mobile GPS receiver receives the ephemeris and time model for an in-view GPS satellite from the earth-based source prior to acquisition of the in-view GPS satellite, and wherein receipt of the ephemeris and time model enables the mobile GPS receiver to rapidly acquire the in-view GPS satellite without need of an ephemeris and time model transmitted directly from the in-view GPS satellite to the mobile GPS receiver.

47. The GPS system of claim 5, wherein the mobile GPS receiver receives the ephemeris and time model of an in-view GPS satellite from the earth-based source prior to initial acquisition of the in-view GPS satellite, and wherein the mobile GPS receiver performs initial acquisition of the in-view GPS satellite using the ephemeris and time model of the in-view GPS satellite received from the earth-based source.

48. The GPS system of claim 5, wherein the mobile GPS receiver uses the ephemeris and time models received from the earth-based source in acquiring at least one of the in-view GPS satellites without assistance from ephemeris and time models transmitted directly from the in-view GPS satellites to the mobile GPS receiver.

49. The GPS system of claim 5, wherein said earth-based source of the satellite data message blocks receives the ephemeris and time models from the in-view GPS satellites, and wherein the ephemeris and time models supplied by said earth-based source are the same ephemeris and time models received by said earth-based source from the in-view GPS satellites.

50. The GPS system of claim 5, wherein at least one of the satellite data message blocks supplied to the mobile GPS receiver by the earth-based source is less than 900 bits of a 900 bit satellite data message broadcast by an in-view GPS satellite.

51. The GPS system of claim 5, wherein the earth-based source comprises a database.

52. The invention of claim 5, wherein the ephemeris and time model of at least one of the in-view GPS satellites is used to resolve ambiguity in a time-position of a GPS solution.

53. The method of claim 9, wherein calibrating said receiver local oscillator includes calibrating out frequency bias of said receiver local oscillator using a frequency measurement from the overhead GPS satellite.

54. The method of claim 32, whrein the reduced frequency uncertainty results from calibrating out a frequency bias of a GPS local oscillator using a frequency measurement resulting from acquisition of the first in-view GPS satellite.

55. The invention of claim 1, wherein the satellite data message block contains ephemeris and time models, and the ephemeris and time models included in the satellite data message block supplied to the mobile radio station are only current ephemeris and time models contained in the position information.

56. The system of claim 17, wherein the satellite data message block supplied to the mobile radio station by the earth based source is less than 900 bits.

57. The system of claim 24, wherein the satellite data message block supplied to the mobile GPS receiver by the earth based source is less than 900 bits.

* * * * *